US010969399B1

(12) United States Patent
Chau et al.

(10) Patent No.: US 10,969,399 B1
(45) Date of Patent: Apr. 6, 2021

(54) ADVANCED MECHANICAL SHOCK RESISTANCE FOR AN ACCELEROMETER IN AN INGROUND DEVICE AND ASSOCIATED METHODS

(71) Applicant: Merlin Technology, Inc., Kent, WA (US)

(72) Inventors: Albert W. Chau, Woodinville, WA (US); Kenneth J. Theimer, Auburn, WA (US); Jason Pothier, Auburn, WA (US)

(73) Assignee: Merlin Technology, Inc., Kent, WA (US)

( * ) Notice: Subject to any disclaimer, the term of this patent is extended or adjusted under 35 U.S.C. 154(b) by 822 days.

(21) Appl. No.: 14/800,454

(22) Filed: Jul. 15, 2015

Related U.S. Application Data

(60) Provisional application No. 62/025,799, filed on Jul. 17, 2014.

(51) Int. Cl.
  *G01P 1/02* (2006.01)
  *E21B 47/09* (2012.01)
  *E21B 47/12* (2012.01)

(52) U.S. Cl.
  CPC .............. *G01P 1/023* (2013.01); *E21B 47/09* (2013.01); *E21B 47/12* (2013.01)

(58) Field of Classification Search
  CPC .......... G01P 1/023; G01P 1/003; G01P 15/02; G01P 15/08; G01P 15/00; E21B 47/09; E21B 47/12; G05D 13/00
  (Continued)

(56) References Cited

U.S. PATENT DOCUMENTS 3,788,149 A * 1/1974 Wilner ................ G01P 15/0891
  338/46
4,590,801 A 5/1986 Merhav
(Continued)

FOREIGN PATENT DOCUMENTS

CN  103776448 A  5/2014
WO  WO 2010/057055  5/2010
(Continued)

OTHER PUBLICATIONS

International Preliminary Report on Patentability from the International Preliminary Examining Authority for International Application No. PCT/US2015/038920 which is associated with U.S. Appl. No. 14/789,071, dated Nov. 3, 2016, Moscow, Russia.
(Continued)

*Primary Examiner* — Suman K Nath
(74) *Attorney, Agent, or Firm* — Pritzkau Patent Group LLC

(57) ABSTRACT

An accelerometer module is supported within an interior passage of a transmitter housing of a transmitter that is itself receivable within an inground housing of an inground tool to perform an inground operation which subjects the transmitter to mechanical shock and vibration. An accelerometer housing of the module includes an exterior periphery that is receivable in the interior passage of the transmitter. A resilient damping foam can be supported to dispose the foam between the accelerometer housing and the transmitter housing such that the foam cooperates with the accelerometer housing to form a complex mass-spring-damper system that exhibits a resonant frequency which is controllable. An accelerometer cartridge of the module can include a mass that is at least five times the mass of an original accelerometer cartridge. In one feature, the accelerometer cartridge can
(Continued)

include a mass of at least 20 grams for a one inch diameter transmitter housing.

16 Claims, 5 Drawing Sheets

(58) Field of Classification Search
USPC .................. 73/526, 539, 12.04, 855, 204.22
See application file for complete search history.

(56) References Cited

U.S. PATENT DOCUMENTS

| | | | |
|---|---|---|---|
| 5,848,383 | A | 12/1998 | Yunus |
| 6,031,317 | A | 2/2000 | Chen |
| 6,722,203 | B1 | 4/2004 | Evans et al. |
| 7,028,779 | B2 | 4/2006 | Chau |
| 8,042,396 | B2 | 10/2011 | Coronato et al. |
| 8,662,200 | B2 | 3/2014 | Chau et al. |
| 2002/0088932 | A1* | 7/2002 | Kelleher .................. G01P 15/08 250/227.21 |
| 2003/0070483 | A1 | 4/2003 | Mueller |
| 2004/0266480 | A1 | 12/2004 | Hjelt et al. |
| 2006/0185432 | A1 | 8/2006 | Weinberg |
| 2006/0267189 | A1 | 11/2006 | Usui |
| 2008/0136564 | A1* | 6/2008 | Winfree .................. G01P 1/023 333/186 |
| 2009/0056446 | A1 | 3/2009 | Cluff et al. |
| 2009/0255335 | A1 | 10/2009 | Fly |
| 2012/0218863 | A1* | 8/2012 | Chau ...................... E21B 47/12 367/82 |
| 2013/0173207 | A1 | 7/2013 | Tanenhaus |
| 2013/0176139 | A1 | 7/2013 | Chau et al. |
| 2013/0239650 | A1* | 9/2013 | Chau ...................... G01P 15/08 73/1.38 |
| 2014/0111839 | A1* | 4/2014 | Suzuki .................. B06B 1/0238 359/198.1 |
| 2014/0123754 | A1 | 5/2014 | Watanabe |
| 2014/0318245 | A1 | 10/2014 | Perego |
| 2016/0003863 | A1 | 1/2016 | Chau et al. |

FOREIGN PATENT DOCUMENTS

| | | |
|---|---|---|
| WO | WO 2010/065272 A2 | 6/2010 |
| WO | WO 2011/144883 A1 | 11/2011 |

OTHER PUBLICATIONS

The International Search Report and the Written Opinion of the International Searching Authority for International Application No. PCT/US2015/038920 which is associated with U.S. Appl. No. 14/789,071, dated Nov. 12, 2015, Moscow, Russia.

Written Opinion of the International Preliminary Examining Authority for International Application No. PCT/US2015/038920 which is associated with U.S. Appl. No. 14/789,071, dated Aug. 12, 2016, Russia.

The First Office Action of the State Intellectual Property Office of People's Republic of China for Chinese Application No. 201580020102.2 which is associated with International Application No. PCT/US2015/038920 which is associated with U.S. Appl. No. 14/789,071, dated Nov. 3, 2017. (Machine translation included).

Extended European Search Report for European Application No. 15814989.8 which is associated with International Application No. PCT/US2015/038920 which is associated with U.S. Appl. No. 14/789,071, dated Jan. 15, 2018, Munich, Germany.

English translation of the previously cited reference: The First Office Action of the State Intellectual Property Office of People's Republic of China for Chinese Application No. 201580020102.2 which is associated with International Application No. PCT/US2015/038920 which is associated with U.S. Appl. No. 14/789,071, dated Nov. 3, 2017.

The Second Office Action of the State Intellectual Property Office of People's Republic of China for Chinese Application No. 201580020102.2 which is associated with International Application No. PCT/US2015/038920 which is associated with U.S. Appl. No. 14/789,071, dated May 9, 2018. (Machine translation included).

* cited by examiner

ADVANCED MECHANICAL SHOCK RESISTANCE FOR AN ACCELEROMETER IN AN INGROUND DEVICE AND ASSOCIATED METHODS

RELATED APPLICATION

The present application claims priority from U.S. Provisional Patent Application No. 62/025,799 filed on Jul. 17, 2014 and which is hereby incorporated by reference in its entirety.

BACKGROUND

The present application is generally related to MEMS accelerometers and, more particularly, to a MEMS accelerometer cartridge, module and inground device having enhanced resistance to mechanical shock, as well as an associated method.

Inground devices such as, for example, transmitters are often located within the housing of an inground tool at the distal end of a drill string for use while performing an inground operation. The inground operation, by way of non-limiting example, can be a boring operation for purposes of forming a borehole, in which case the inground device can be housed in an inground tool that can be referred to as a boring tool; a pullback operation which may employ a reamer to widen a borehole while pulling a utility therethrough, in which case the transmitter can be received in a housing that is adapted for the reaming/pullback operation; or a mapping operation in which the inground device can be caused to transit through a preexisting utility in a suitable manner without the need for a drill string. Accelerometers can provide outputs that can be used for purposes of determining the angular orientation of the inground device. It is noted that, in some embodiments of the prior art, all the sensors, including the accelerometers, have been co-located on a common or main printed circuit board.

When an accelerometer such as, for example, a triaxial accelerometer is used to sense the angular orientation of the inground device (which can be referred to interchangeably as a sonde or transmitter), pitch and roll orientation of the device can be determined based on the accelerometer outputs. The determination of pitch and roll orientation of an inground tool in a horizontal directional drilling system can be critical information, since the pitch and roll orientation are used for purposes of steering and guiding the boring tool that houses the sonde. Unfortunately, inground environments such as, for example, horizontal directional drilling can subject the accelerometer to extremely high levels of mechanical shock. Such exposure can result in failure of the accelerometer which necessitates replacement of the sonde. In attempting to address concerns with respect to exposure of the accelerometer to mechanical shock, one prior art approach for a transmitter having the accelerometer installed on the main printed circuit board is to shock mount the entire main circuit board of the transmitter and associated components such as an antenna. Unfortunately, this approach is likely to lead to the need to increase the diameter of the transmitter due to the sheer physical size of the main circuit board and associated components. Increasing the diameter of the transmitter, in turn, generally leads to the need to increase the diameter of a boring tool that is configured to house the transmitter. Applicants recognize that the latter raises a number of concerns including the fact that an increased diameter transmitter will not likely fit in existing boring tools. Applicants further recognize that increasing the diameter of a boring tool to accommodate a larger diameter transmitter is highly undesirable since even a small increase results in the need to move a significantly greater amount of material during a horizontal directional drilling operation. For example, increasing a boring tool housing diameter by only 0.25 inch from 3.00 inches to 3.25 inches results in moving approximately 17% more material to form a borehole. Another approach that has been taken by the prior art is to support the accelerometer in an accelerometer housing separate from the main printed circuit board. In the latter approach, the accelerometer housing is generally received by the overall sonde housing with as much foam damping material as practical interposed between the accelerometer housing and the sonde housing. Applicants submit that the prior art has failed to recognize significant deficiencies with respect to the latter approach, as will be further discussed hereinafter.

The present disclosure brings to light a heretofore unseen apparatus and associated method for supporting the accelerometer and an associated accelerometer module/cartridge in a way that provides for sweeping improvements with respect to isolation of the accelerometer(s) from mechanical shock, as will be described hereinafter.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, an apparatus and associated method are described. In one aspect of the present disclosure, an accelerometer cartridge is configured to be supported within an interior passage of a transmitter housing of a transmitter that is itself receivable within an inground housing of an inground tool to perform an inground operation which subjects the transmitter to mechanical shock and vibration. The accelerometer cartridge includes an accelerometer arrangement for generating accelerometer signals that at least characterize an orientation of the transmitter and which is subject to failure responsive to exposure to the mechanical shock and vibration. An accelerometer housing includes an exterior periphery that is receivable in the interior passage of the transmitter housing and has a mass of at least 17.2 grams such that the accelerometer arrangement is subject to enhanced isolation from the mechanical shock and vibration. In this regard, Applicants have discovered an approach which is submitted to be counterintuitive to that of the prior art. In particular, the mass of the accelerometer housing is increased or maximized in a way that can cooperate with associated damping to control and lower resonant frequency response to the mechanical shock and vibration.

In another aspect of the present disclosure, a transmitter and associated method are described for use in a system for performing a horizontal directional drilling operation which subjects the transmitter to mechanical shock and vibration. The transmitter includes a transmitter housing that is receivable in an inground tool for performing the horizontal directional drilling operation and the transmitter housing defines an accelerometer compartment having an inside diameter. An accelerometer arrangement is configured for generating accelerometer signals for use in characterizing one or more orientation parameters of the transmitter, with the accelerometer arrangement being subject to potential failure based on exposure to the mechanical shock and vibration. An electronics assembly is configured for receiving the accelerometer signals and producing a transmitter output responsive thereto. An accelerometer housing defines an interior cavity for receiving the accelerometer arrangement and an exterior periphery that is complementary to the inside diameter of the accelerometer compartment and receivable therein, with the accelerometer housing having a mass of, at least approximately, 17.2 grams or more such that the accelerometer arrangement is subject to enhanced isolation from the mechanical shock and vibration.

In still another aspect of the disclosure, an accelerometer module and associated method are described. The accelerometer module is configured to be supported within an interior passage of a transmitter housing of a transmitter that is itself receivable within an inground housing of an inground tool to perform an inground operation which subjects the transmitter to mechanical shock and vibration. The accelerometer module includes an accelerometer arrangement for generating accelerometer signals that at least characterize an orientation of the transmitter and which is subject to failure responsive to exposure to the mechanical shock and vibration. An accelerometer housing includes an exterior periphery that is receivable in the interior passage of the transmitter housing. A resilient damping foam supported such that the resilient damping foam is disposed between the accelerometer housing and the transmitter housing when the accelerometer housing is installed therein, the resilient damping foam having a thickness disposed between the accelerometer housing and the transmitter housing such that the resilient damping foam cooperates with the accelerometer housing to form a complex mass-spring-damper system that exhibits a resonant frequency which is controllable.

In yet another aspect of the present disclosure, an accelerometer module and associated method are described. The accelerometer module is configured to be supported within an interior passage of a transmitter housing of a transmitter that is itself receivable within an inground housing of an inground tool to perform an inground operation which subjects the transmitter to mechanical shock and vibration. The accelerometer module includes an accelerometer arrangement for generating accelerometer signals that at least characterize an orientation of the transmitter and which is subject to failure responsive to exposure to the mechanical shock and vibration. An accelerometer housing includes an exterior periphery that is receivable in the interior passage of the transmitter housing and a resilient damping foam supported such that the resilient damping foam is disposed between the accelerometer housing and the transmitter housing when the accelerometer housing is installed therein, the resilient damping foam having a stopping distance and having a thickness disposed between the accelerometer housing and the transmitter housing that is at least approximately equal to the stopping distance.

In a continuing aspect of the present disclosure, an improved accelerometer cartridge and associated method are described wherein the improved accelerometer cartridge is interchangeable with an original accelerometer cartridge as part of a transmitter that is configured to be supported by an inground housing to perform an inground operation which subjects the transmitter to mechanical shock and vibration. The transmitter includes a transmitter housing that defines an accelerometer compartment having a given size. The improved accelerometer cartridge includes an improved accelerometer housing defining an interior cavity and an exterior periphery that is receivable within the given size of the accelerometer compartment of the transmitter housing for increasing an overall mass of the improved accelerometer cartridge as compared to the original accelerometer cartridge. An accelerometer is received in the interior cavity of the improved accelerometer housing and the improved accelerometer cartridge includes a mass that is at least five times the mass of the original accelerometer cartridge for the given size of the accelerometer compartment such that the accelerometer experiences enhanced isolation from the mechanical shock and vibration responsive to the increased mass of the improved accelerometer cartridge.

BRIEF DESCRIPTIONS OF THE DRAWINGS

Example embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
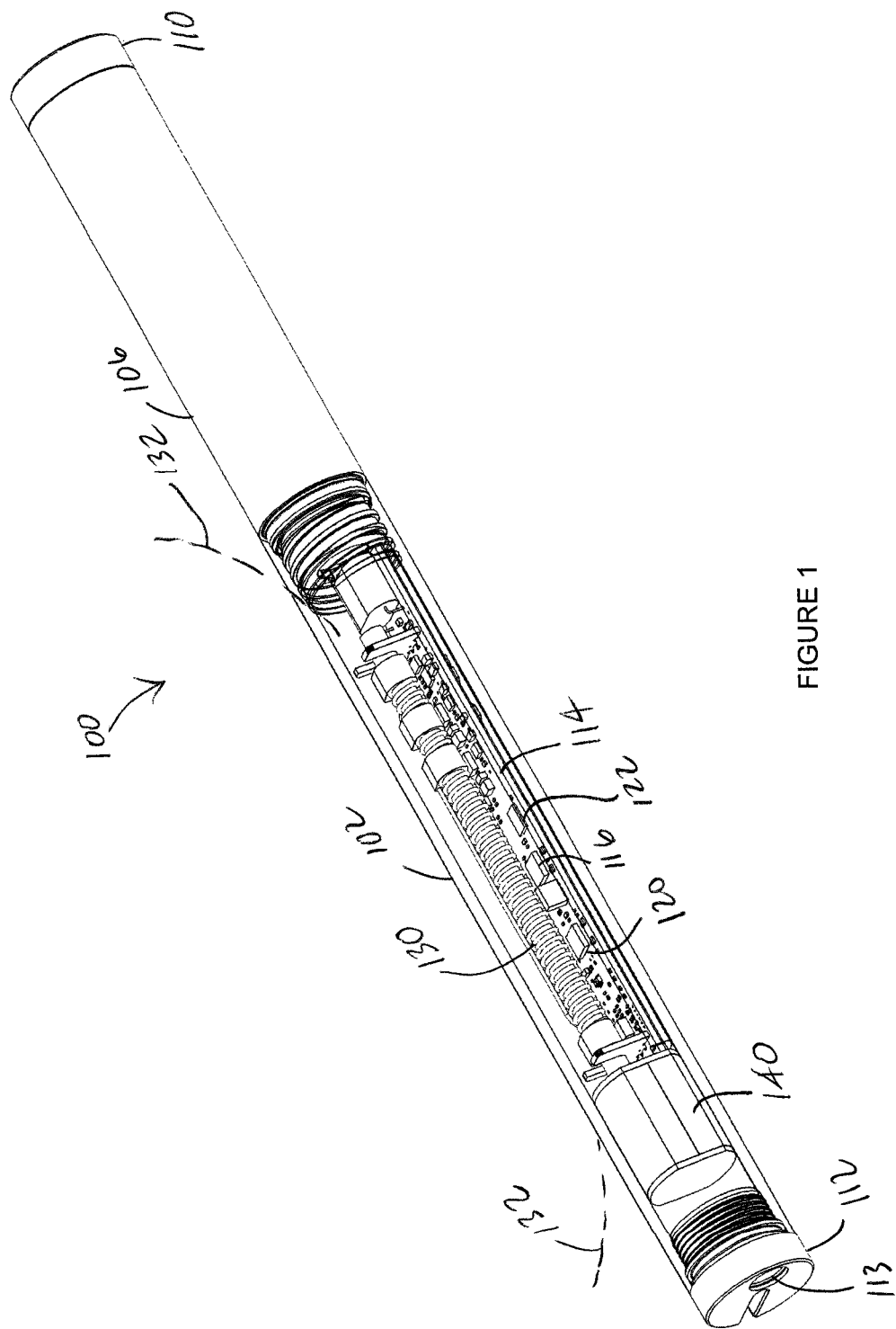
FIG. 1 is a diagrammatic view, in perspective, of an embodiment of an inground device including an embodiment of an accelerometer module produced in accordance with the present disclosure.

Attention is now directed to FIG. 1 which is a diagrammatic view, in perspective, of an embodiment of an inground device, generally indicated by the reference number 100, produced in accordance with the present disclosure. Device 100, by way of non-limiting example, is a transmitter including a main housing body 102 and a battery compartment housing body 106. It is noted that the former has been rendered transparent to an extent that enables the illustration of internal components. The battery and main housing bodies can be configured for threaded engagement and formed from suitable materials. For example, in an embodiment, the main housing body can be formed, for example, from fiberglass with the battery housing body formed, for example, from an electrically conductive material. While the inground device can be referred to herein as a transmitter, it should be appreciated that the present disclosure is applicable with respect to other suitable forms of the inground device such as, for example, a transceiver. Further, inground devices of a specific type such as transmitters can be offered in a range of embodiments that differ in feature set and/or precision. A first end cap 110 is removably received on the battery compartment housing for purposes of replacing batteries therein. A second end cap 112 is received on an outward end of main housing body 102. End cap 112 can be configured to receive a temperature button 113, although this is not required. A main printed circuit board 114 includes any suitable arrangement of electronic components such as, for example, a processor 116 and a memory 120. Sensors such as, for example, a temperature sensor 122 can be supported on the main printed circuit board.

Figure 2:
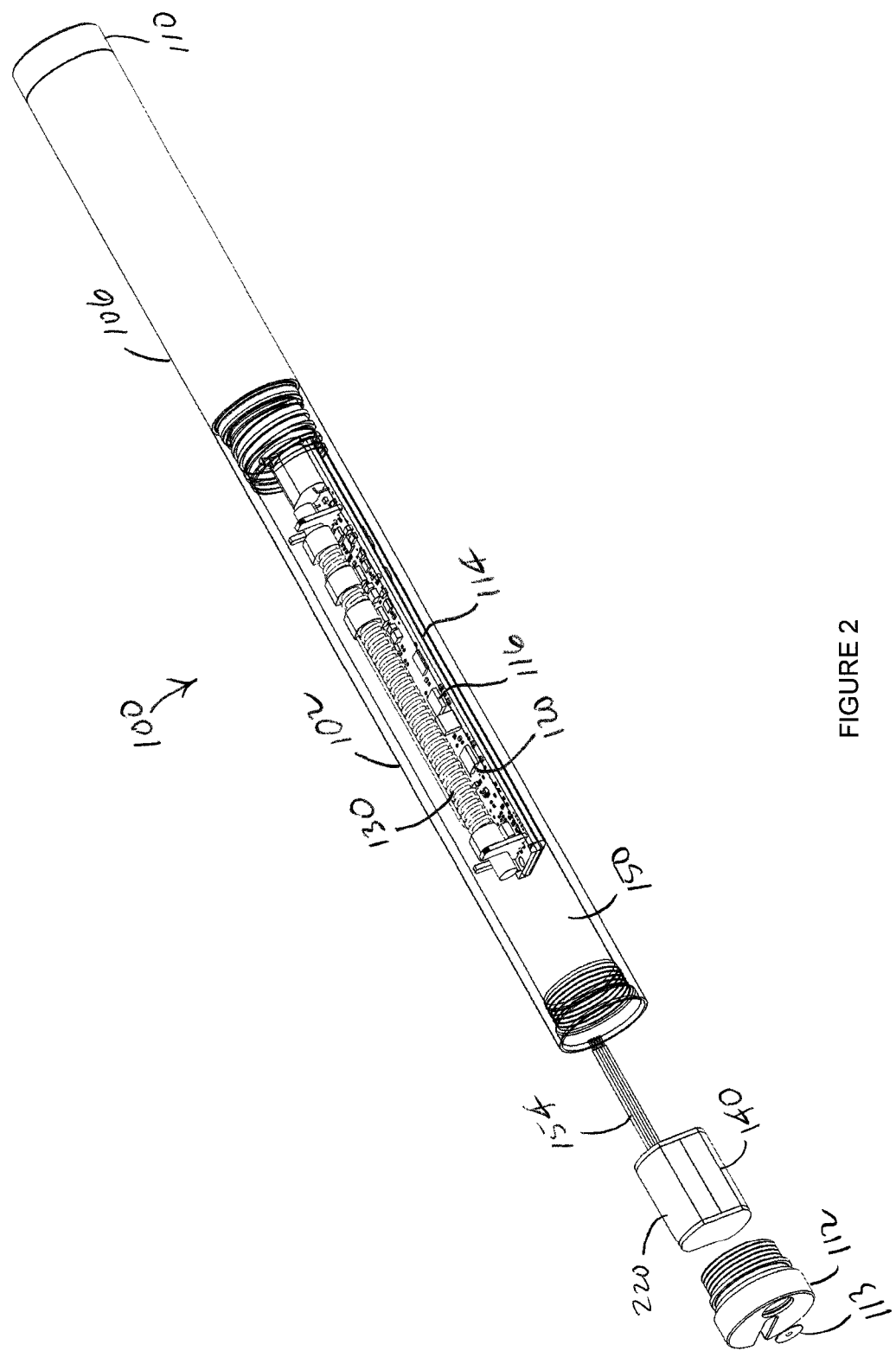
FIG. 2 is a diagrammatic and partially exploded view, in perspective of the embodiment of the inground device of FIG. 1 along with the embodiment of the accelerometer module.

Referring now to FIG. 2 in conjunction with FIG. 1, the former illustrates transmitter 100 in a diagrammatic, partially exploded perspective view. A dipole antenna 130 can be supported on printed circuit board 114 by standoffs. In the present embodiment, dipole antenna 130 can transmit a dipole electromagnetic locating field 132 that can be modulated with any desired data that is generated by the transmitter assembly including, for example, sensor derived data such as pressure, temperature, positional orientation and/or accelerometer-based data. Typical signals that can be transmitted include but are not limited to roll, pitch, yaw, temperature, battery status and pressure. In some cases, the parameter of interest can be sensed in a direct way by using a suitable sensor such as, for example, a pressure or temperature sensor. With regard to accelerometer-based data, an accelerometer module (which may be referred to as a cartridge) 140 is positioned adjacent to the end of the dipole antenna and printed circuit board. It should be appreciated that an antenna is not a requirement since some embodiments may not transmit an electromagnetic signal but rather transmit information up a drill string, as described for example, in U.S. Pat. No. 7,028,779 using a wire-in-pipe arrangement or U.S. Pat. No. 8,662,200 using the drill string as an electrical conductor, both of which are incorporated herein by reference. As will be further described, accelerometer module 140 receives an accelerometer board. An accelerometer compartment 150 (FIG. 2) can be located proximate to second end cap 112 having extents that are at least somewhat complementary with respect to the peripheral extents of accelerometer module 140. In an embodiment, the interior diameter of main body housing 102 can be at least approximately 1 inch. Printed circuit board 114 can carry an interface for electrical connection to a cable 154 (FIG. 2) that extends from the accelerometer module.

Figure 3:
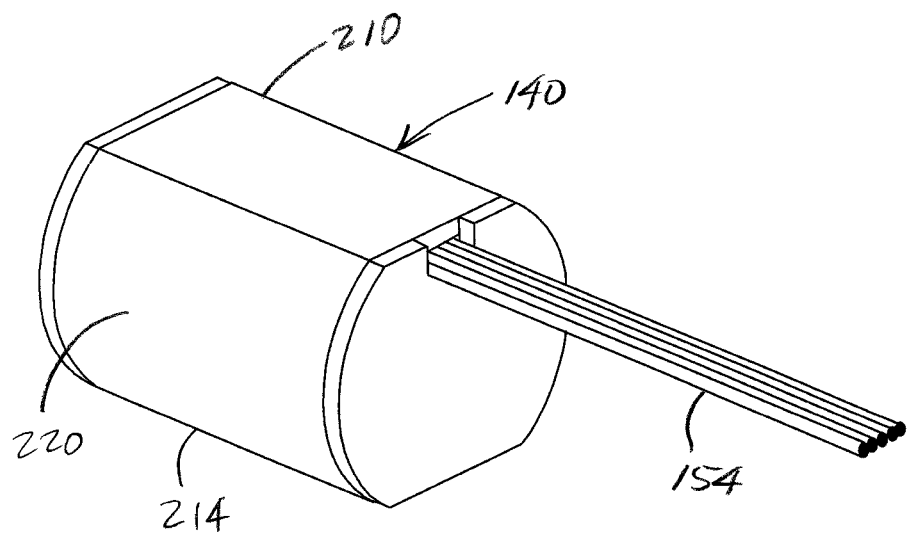
FIG. 3 is a diagrammatic view, in perspective, showing an embodiment of an accelerometer module in accordance with the present disclosure.
Figure 4:
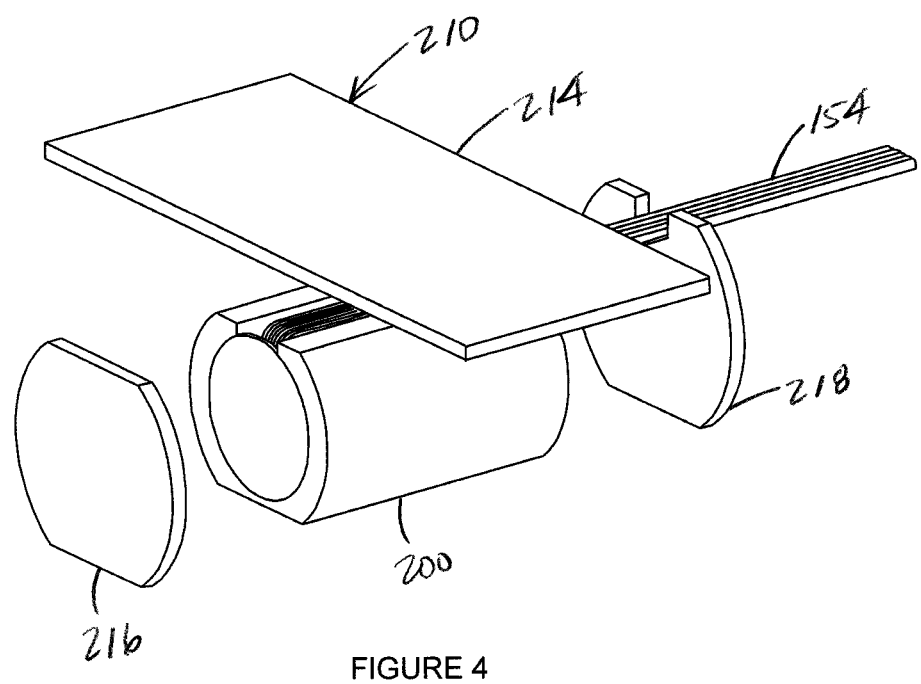
FIG. 4 is a diagrammatic and partially exploded view, in perspective, showing further details of the embodiment of the accelerometer module shown in FIG. 3.

Referring to FIGS. 3 and 4, the former illustrates an embodiment of accelerometer module 140 in a diagrammatic assembled perspective view while the latter illustrates the embodiment in a diagrammatic perspective, partially exploded view. An accelerometer cartridge 200 is configured as shown having cable 154 extending therefrom. An embodiment of a resilient damping arrangement 210 includes a wraparound member 214, a first end piece 216 and a second end piece 218. The resilient damping arrangement serves as a low spring constant centering mechanism for the accelerometer cartridge within the main body housing of the transmitter. The various elements of the resilient damping arrangement can be provided in a wide variety of embodiments including, for example, a different number of pieces and/or different geometric shapes, while still remaining within the scope of the teachings herein. Any suitable material can be used for the elements of the resilient damping arrangement such as, for example, silicone foam that is intended for shock isolation applications. The material can be used in any suitable thickness ranging, for example, from 0.03 inch to 0.15 inch, so long as the teachings herein are applied. As noted above, the assembly of FIG. 3 is configured for receipt in accelerometer compartment 150 of FIG. 2. In particular, curved sidewalls 220 (FIG. 3) of wraparound member 210 of the resilient damping arrangement, when the accelerometer module is received in the accelerometer cavity, can resiliently bias against the interior peripheral surface of main body 102 to receive the accelerometer module such that the accelerometer(s) is in a neutral or home position. During normal operation, in the absence of excessive mechanical shock, the position of the accelerometer(s) within the module is maintained in the neutral or home position. Further details with respect to the accelerometer cartridge and the resilient damping arrangement will be provided at appropriate points hereinafter.

Figure 5:
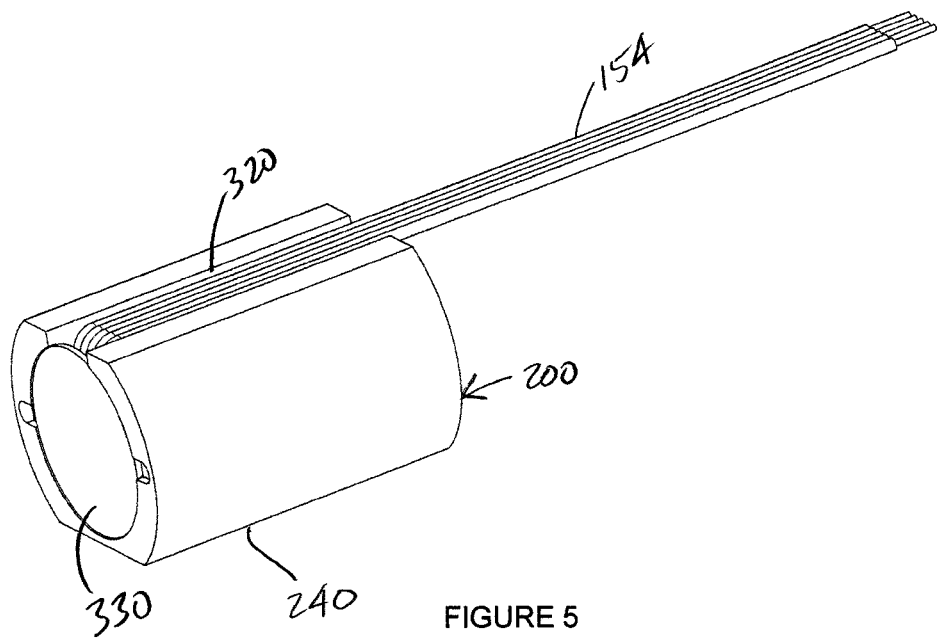
FIG. 5 is a diagrammatic view, in perspective, illustrating an embodiment of an accelerometer cartridge in accordance with the present disclosure.
Figure 6:
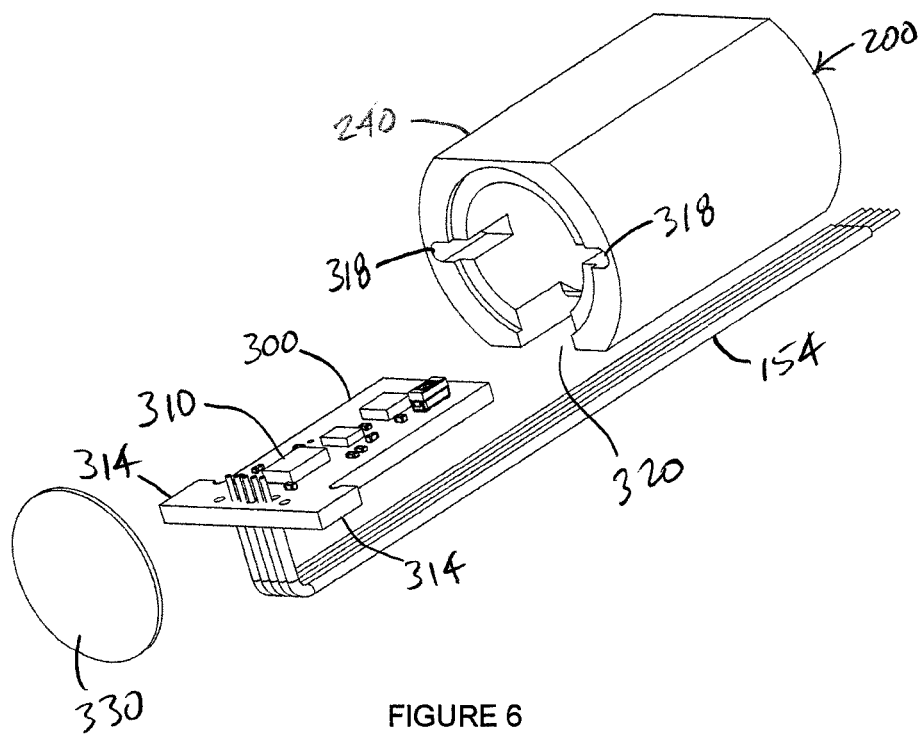
FIG. 6 is a diagrammatic and partially exploded view, in perspective, showing further details of the embodiment of the accelerometer cartridge of FIG. 5.

Attention is now directed to FIGS. 5 and 6 which illustrate an embodiment of accelerometer cartridge 200 including a housing 240 that is configured for receiving an accelerometer printed circuit board 300 that is electrically connected to cable 154 such that printed circuit board (PCB) 300 physically supports an accelerometer arrangement 310 such as, for example, a triaxial accelerometer. In an embodiment, the triaxial accelerometer can be a MEMS triaxial accelerometer. FIG. 5 is a diagrammatic assembled, perspective view while FIG. 6 is a diagrammatic partially exploded, perspective view. PCB 300 can include ears 314 that are receivable within grooves 318 of the cartridge. The latter can define a groove 320 for receiving cable 154. The cable can be routed in this manner, around the cartridge beneath the resilient damping arrangement, in order to avoid the application of forces to the cartridge by the cable which might impede movement of the cartridge relative to the transmitter housing in response to a mechanical shock. The extended length of cable 154 can likewise serve in accomplishing this purpose. Ears 314 can be secured in an installed position, for example, using a suitable adhesive. Once printed circuit board 300 is installed in cartridge 200, a cap 330 can be installed, for example, using a suitable adhesive to close the opening of the cartridge. A similar cap (not visible) can be installed at the opposing end of the cartridge. In the present embodiment, printed circuit board 300 is supported within the cartridge without potting compound, although this is not a requirement.

Figure 7:
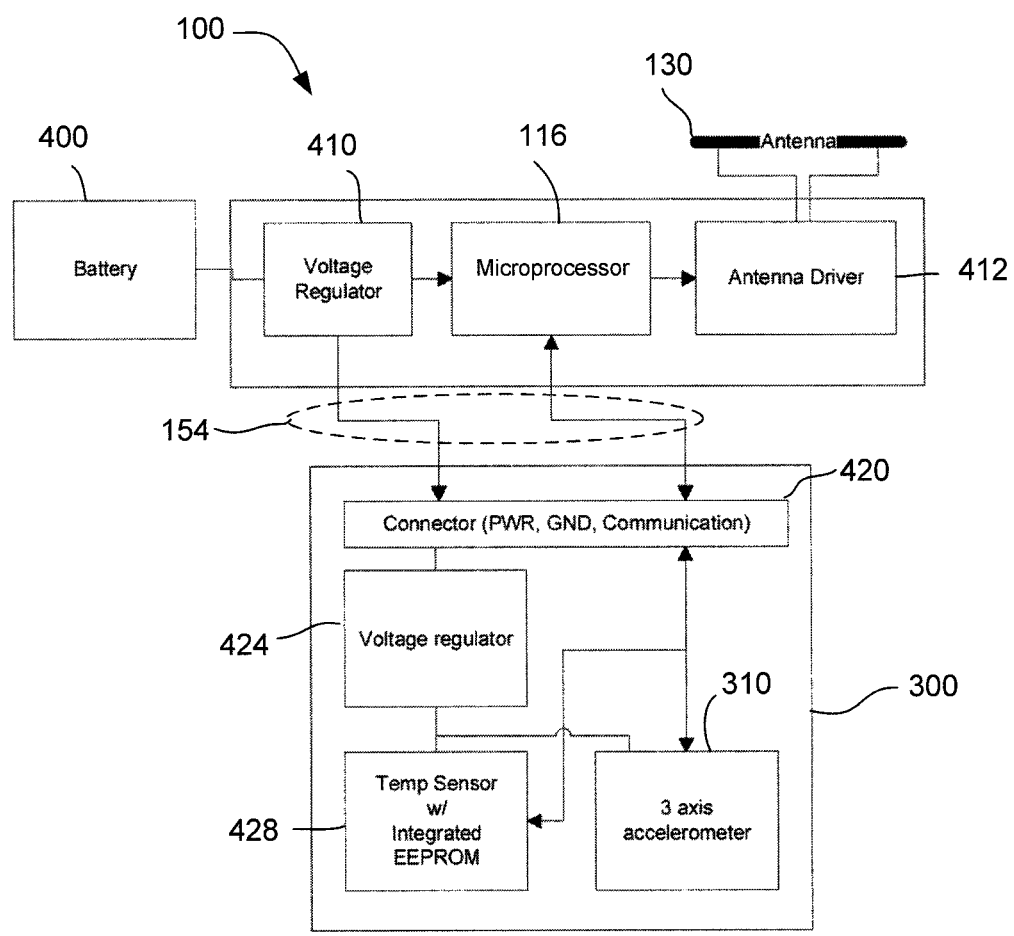
FIG. 7 is a block diagram illustrating an embodiment of an inground device in the form of a transmitter, which includes an accelerometer module, in accordance with the present disclosure.

FIG. 7 is a block diagram that illustrates an embodiment of transmitter 100, including accelerometer board 300, as described above. Additionally, a battery 400 is illustrated as well as a voltage regulator 410 and an antenna driver 412 for driving antenna 130. Board 300 can include accelerometer 310 as well as additional components such as an electrical interface 420 for connection to cable 154, a voltage regulator 424 and a temperature sensor 428, along with associated memory. In an embodiment, interface 420 can support an I²C interface which is a form of serial digital interface, although this is not required.

Referring to FIGS. 1-6, Applicants bring to light the recognition that accelerometer cartridge 200, including PCB 300 installed therein, and resilient damping arrangement 210, captured within main housing 102, behave in the manner of a complex mass-spring-damper system when exposed to a mechanical shock. Based on this recognition, Applicants have configured this system in a way which has been empirically demonstrated to dramatically reduce the exposure of accelerometers within the accelerometer module to mechanical shock and which is submitted to be counterintuitive to the approaches that have been taken by those of ordinary skill in the art. As noted above, the approach that has generally been taken by the prior art is submitted to involve maximizing the thickness of the resilient damping foam surrounding a housing that supports the accelerometer. The accelerometer has typically been installed in lightweight tubing that is surrounded by this foam. Applicants now recognize that this prior art approach is incorrect, as will be discussed immediately hereinafter.

Based on the recognition that the accelerometer cartridge and resilient damping arrangement behave in the manner of a complex mass-spring-damper system, Applicants further recognize that exposure of the accelerometer(s) to mechanical shock can be dramatically mitigated by configuring the mass-spring-damper system to exhibit a low resonant frequency. In this way, the response of the system to a mechanical shock impulse will be reduced. Stated in another way, the response will rapidly decay. In an embodiment, the resonant frequency can be as low as practical. The resonant frequency $F_R$ is a function of the square root of the spring constant K divided by the mass m, given as:

$$F_R \propto \sqrt{\frac{K}{m}} \quad \text{(EQN. 1)}$$

Given this relationship, the resonant frequency can be made low by making the mass high and/or making the spring constant low. In an embodiment, the mass can be as high as practical while the spring constant is as low as practical. Accordingly, the mass of accelerometer cartridge 200 can be made as high or at least nearly as high as practical. Factors which influence the mass of the cartridge include the material from which the cartridge is formed and the overall dimensions of the cartridge, both exterior and interior. In terms of materials, a high density material is appropriate. Suitable materials include high density compounds such as tungsten carbide, metal alloys such as brass and bronze, and metals such as steel. While lead is a high density material, there are associated environmental concerns. Any suitable high density material, either currently available or yet to be developed, can be utilized. Accordingly, an accelerometer module configured in accordance with the present application can be designated as a massive accelerometer module. In contrast, the prior art typically used a lightweight metal or plastic tube for purposes of supporting the accelerometer(s). By surrounding a lightweight support tube with relatively large amounts of damping foam in the prior art, a low mass and a high spring constant were produced which resulted in a correspondingly high resonant frequency based on the relationship above. Applicants have readily achieved embodiments of the accelerometer cartridge having a mass that is five times that of prior art configurations for an accelerometer compartment of a given size in a transmitter. In cooperation with the resilient damping arrangement, shock exposure to which the accelerometer(s) is subjected has been reduced by a factor of at least 3. In some embodiments, the shock exposure reduction factor has approached twenty times. On this basis, Applicant would anticipate a correspondingly dramatic change in resonant frequency. The latter, however, is exceptionally difficult to determine with accuracy in terms of direct physical measurement. Results based on finite element analysis of a number of embodiments, however, appear to confirm that large changes in the resonant frequency are occurring.

Given the benefit of increasing the mass of the accelerometer cartridge, one might conclude that a very thin layer of resilient damping material should be used to surround the cartridge. Such a thin layer also would exhibit a small spring constant. Applicant recognizes, however, that there is a competing interest with respect to the thickness of the resilient damping material since the latter provides what can be referred to as a sway space that allows the accelerometer cartridge to move relative to transmitter housing. If the foam is too thin, the sway space will be insufficient, resulting in underdamped collisions between the accelerometer cartridge and the transmitter housing. Further, the mechanical shock to which the accelerometer(s) within the accelerometer cartridge are subjected is proportional to the square of the accelerometer velocity divided by twice the stopping distance, given as:

$$\text{Accelerometer Shock} \propto \frac{v^2}{2 \times \text{stopping distance}} \quad \text{(EQN. 2)}$$

It should be appreciated, however, that for a given resilient damping foam, the stopping distance is essentially a predetermined value. Once the thickness is sufficient to provide the stopping distance that is associated with a particular foam, Applicant recognizes that essentially no further benefit can be obtained by increasing the thickness of the foam and, in fact, increasing the foam thickness serves to increase the spring constant which results in an increase in the resonant frequency. When seen in this light, controlling the mass of the accelerometer cartridge can be considered essentially as a senior independent variable for purposes of reducing the resonant frequency.

A massive accelerometer module in accordance with the present disclosure includes a MEMS-based accelerometer such as, for example, a triaxial accelerometer. Embodiments of the accelerometer cartridge of the present disclosure can have a mass of at least approximately 20 grams or more. Applicants note that the teachings herein have been reduced to practice. In a working embodiment, the accelerometer cartridge was implemented having a mass of approximately 47 grams (0.104 lb), which represents an increase in mass by a factor of approximately 7 over Applicants' prior designs. It is noted that accelerometer board 300 and components thereon, do not generally represent a significant contribution to the mass of the massive accelerometer module. For example, Applicants' accelerometer board includes a mass of approximately 2.8 grams or about 6 percent of the mass of the accelerometer cartridge. Based on the application of the teachings that have been brought to light herein, Applicants' working embodiment has achieved a factor of reduction in accelerometer failure rate of over an order of magnitude. This remarkable improvement in performance was not expected by Applicants and has resulted in a level of reliability that is submitted to be heretofore unseen.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. An accelerometer module including an accelerometer cartridge that is configured to be supported within an interior passage of a transmitter housing of a transmitter that is itself receivable within an inground housing of an inground tool to perform an inground operation which subjects the transmitter to mechanical shock and vibration, said accelerometer module comprising:
   an accelerometer arrangement forming one part of the accelerometer cartridge for generating accelerometer signals that at least characterize an orientation of the transmitter and which is subject to failure responsive to exposure to the mechanical shock and vibration;
   an accelerometer housing forming another part of the accelerometer cartridge having an exterior periphery that is receivable in the interior passage of the transmitter housing and defining an interior that receives the accelerometer arrangement, said accelerometer housing including a mass of at least 17.2 grams such that the accelerometer arrangement is subject to enhanced isolation from the mechanical shock and vibration; and
   a resilient damping foam supported such that the resilient damping foam is disposed between the accelerometer housing and the transmitter housing when the accelerometer housing is installed therein, the resilient damping foam having a thickness disposed between the accelerometer housing and the transmitter housing such that the resilient damping foam cooperates with the accelerometer housing to form a complex mass-spring-damper system that exhibits a resonant frequency which is controllable based on a spring constant, that is responsive to the thickness of the resilient damping foam, in conjunction with an overall mass of the accelerometer cartridge.

2. The accelerometer module of claim 1 wherein the interior passage of the transmitter housing is, at least approximately, 1 inch in diameter and the accelerometer housing is configured to be received within such diameter.

3. The accelerometer module of claim 1 wherein the accelerometer arrangement includes a MEMS triaxial accelerometer.

4. The accelerometer module of claim 1 wherein the accelerometer arrangement includes a printed circuit board and an accelerometer and a combined mass of the accelerometer cartridge is at least approximately 20 grams.

5. The accelerometer module of claim 1 wherein the accelerometer cartridge includes an overall mass of at least approximately 47 grams wherein the accelerometer arrangement makes up about 6 percent of the mass of the accelerometer cartridge.

6. The accelerometer module of claim 1 wherein the accelerometer housing is formed from a high density compound selected from tungsten carbide, brass, bronze and steel.

7. The accelerometer module of claim 1 wherein the accelerometer arrangement includes a mass of approximately 6 percent of the accelerometer cartridge.

8. The accelerometer module of claim 1 wherein the accelerometer housing includes a mass of approximately 44.2 grams.

9. A transmitter for use in a system for performing a horizontal directional drilling operation which subjects the transmitter to mechanical shock and vibration, said transmitter including a transmitter housing that is receivable in an inground tool for performing the horizontal directional drilling operation, said transmitter comprising:
   said transmitter housing defining an accelerometer compartment having an inside diameter;
   an accelerometer arrangement for generating accelerometer signals for use in characterizing one or more orientation parameters of the transmitter, said accelerometer arrangement being subject to potential failure based on exposure to the mechanical shock and vibration;
   an electronics assembly for receiving the accelerometer signals and producing a transmitter output responsive thereto;
   an accelerometer housing defining an interior cavity for receiving the accelerometer arrangement and an exterior periphery that is complementary to the inside diameter of the accelerometer compartment and receivable therein, said accelerometer housing having a mass of at least approximately 17.2 grams or more such that the accelerometer arrangement is subject to enhanced isolation from the mechanical shock and vibration; and
   a resilient damping foam supported such that the resilient foam is disposed between the accelerometer housing and the transmitter housing when the accelerometer housing is installed therein, the resilient damping foam having a thickness disposed between the accelerometer housing and the transmitter housing such that the resilient damping foam cooperates with the accelerometer housing to form a complex mass-spring-damper system that exhibits a resonant frequency which is controllable based on a spring constant, that is responsive to the thickness of the resilient damping foam, in conjunction with a combined mass of the accelerometer arrangement and the accelerometer housing.

10. The transmitter of claim 9 wherein the inside diameter of the accelerometer compartment of the transmitter is, at least approximately, 1 inch.

11. The transmitter of claim 9 wherein the accelerometer arrangement includes a MEMS triaxial accelerometer.

12. The transmitter of claim 9 wherein the accelerometer arrangement and the accelerometer housing form an accelerometer cartridge having a combined mass of at least approximately 20 grams.

13. The transmitter of claim 9 wherein the accelerometer arrangement and the accelerometer housing form an accelerometer cartridge including a mass of at least approximately 47 grams wherein the accelerometer arrangement makes up about 6 percent of the mass of the accelerometer cartridge.

14. The transmitter of claim 9 wherein the accelerometer housing is formed from a high density compound selected from tungsten carbide, brass, bronze and steel.

15. The transmitter of claim 9 wherein the accelerometer housing includes a mass of approximately 44.2 grams.

16. An accelerometer module that is configured to be supported within an interior passage of a transmitter housing of a transmitter that is itself receivable within an inground housing of an inground tool to perform an inground operation which subjects the transmitter to mechanical shock and vibration, said accelerometer module comprising:
   an accelerometer arrangement for generating accelerometer signals that at least characterize an orientation of the transmitter and which is subject to failure responsive to exposure to the mechanical shock and vibration;
   an accelerometer housing having an exterior periphery that is receivable in the interior passage of the transmitter housing; and a resilient damping foam supported such that the resilient damping foam is disposed between the accelerometer housing and the transmitter housing when the accelerometer housing is installed therein, the resilient damping foam having a thickness disposed between the accelerometer housing and the transmitter housing such that the resilient damping foam cooperates with the accelerometer housing to form a complex mass-spring-damper system that exhibits a resonant frequency which is controllable.

* * * * *